United States Patent Office 2,932,670
Patented Apr. 12, 1960

2,932,670

DERIVATIVES OF GLYCEROL 1,3-DIALKYL ETHERS AND THEIR PREPARATION

Edward S. Blake, Dayton, Ohio, assignor to Monsanto Chemical Company, St. Louis, Mo., a corporation of Delaware No Drawing. Application September 16, 1957
Serial No. 683,922

10 Claims. (Cl. 260—615)

The present invention relates to novel derivatives of glycerol 1,3-dialkyl ethers, and more particularly to such derivatives which are suitable as wetting agents or detergents and to processes of preparing such derivatives.

It is one object of this invention to provide novel chemical compounds, particularly novel reaction products of a glycerol 1,3-dialkyl ether and ethylene oxide.

It is a further object of this invention to provide novel wetting agents or detergents, particularly novel non-ionic surface active reaction products of a glycerol 1,3-dialkyl ether and ethylene oxide.

It is a further object of this invention to provide a process for producing the novel reaction products referred to in the foregoing objects.

Still further objects and advantages of this invention will become apparent from the following description and the appended claims.

The present invention provides novel chemical compounds having the structural formula:

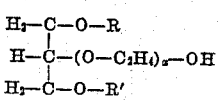

where R and R' are alkyl radicals having a straight or branched carbon chain and containing from 6 to 16 carbon atoms, for example, an octyl, methyl isobutyl carbinyl, decyl or cetyl radical, and $x$ is a number from 10 to 20. In the above formula R and R' may represent identical or dissimilar alkyl radicals. In general, those compounds in which $x$ is a number from 10 to 20 may be used suitably as wetting agents or detergents.

The present invention is more particularly directed to compounds which fall within the scope of the above formula, specifically compounds having the structural formula:

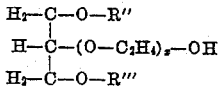

where R" and R'" are identical or dissimilar alkyl radicals having a branched carbon chain which contains from 6 to 16 carbon atoms, preferably branched chain alkyl radicals in which the carbon atom attached to the oxygen atom has two hydrogen atoms, and $x$ is a number from 10 to 20. The efficiency of such compounds as wetting agents or detergents depends on the number and arrangement of carbon atoms in the alkyl radicals and the value of the number $x$. For example, if all other factors are constant, the efficiency of the compounds as wetting agents or detergents increases as the number of —(O—C$_2$H$_4$)— groups increases up to a maximum and then begins to decrease. Similar changes are noted in the compounds when the number of carbon atoms in the alkyl radicals increase from 6 to 16. A particularly useful class of compounds of this invention, which are suitable as wetting agents or detergents, is the class of compounds which have the formula:

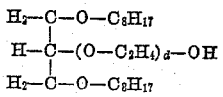

where $d$ is a number from 10 to 20 and where the carbon atoms of the C$_8$H$_{17}$ radicals attached to the 1,3 oxygen atoms of the glycerol residue have two hydrogen atoms.

The products of this invention vary in physical properties from viscous liquids to pasty solids or gel-like solids depending on the number of carbon atoms in the alkyl radicals and the number of polyoxyethylene groups in the molecule. The products which contain the larger alkyl radicals or larger number of poly-oxyethylene groups generally are pasty or gel-like solids.

The chemical compounds of this invention are suitably prepared, in general, by condensing ethylene oxide in the substantial absence of oxygen and in the presence of an alkaline catalyst or condensing agent with a glycerol 1,3-dialkyl ether having the structural formula:

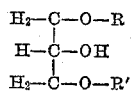

where R and R' have the same significance as hereinbefore given. The preferred starting glycerol 1,3-dialkyl ethers are those which have the structural formula:

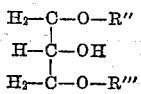

where R" and R'" have the same significance as hereinbefore given. The glycerol 1,3-dialkyl ethers which are used for preparing the preferred chemical compounds of this invention are those having the structural formula:

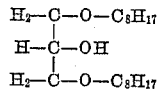

where the carbon atoms of the C$_8$H$_{17}$ radicals attached to the 1,3, oxygen atoms of the glycerol residue have two hydrogen atoms.

In carrying out the processes of this invention the ethylene oxide is employed in amounts ranging from 10 to 20 mols per mol of the glycerol 1,3 di-alkyl ether. A substantially quantitative reaction between the reactants is obtained. For best results it is preferred to add the ethylene oxide to the glycerol 1,3-dialkyl ether slowly, usually over a period of about 1 to 10 hours depending on the total amount of the ethylene oxide used.

The reaction is suitably carried out by purging the reactants completely or substantially completely of air or oxygen and then maintaining the reactants in an atmosphere which is substantially free of oxygen. This may be accomplished, for example, by passing a stream of nitrogen gas through a reaction vessel containing the glycerol 1,3-dialkyl ether until the ether is substantially free of oxygen and then maintaining an atmosphere of nitrogen gas in the reaction vessel during the addition of the ethylene oxide and during the subsequent reaction between the reactants.

For best results the reaction between the ethylene oxide and the glycerol 1,3-dialkyl ether is carried out in the presence of an alkaline catalyst or condensing agent such as an alkali metal hydroxide, for example, NaOH or KOH or an alkali metal alcoholate such as sodium or potassium methylate or sodium or potassium ethylate.

The amount of such catalyst used may be varied considerably. Generally, satisfactory results are obtained by using from about 0.5 to 3% by weight of the catalyst based on the glycerol 1,3-dialkyl ether.

The reaction may be carried out in a closed vessel at atmospheric pressure or relatively low super-atmospheric pressures, for example, a pressure ranging from 1 atmosphere to 10 atmospheres. The reaction may be carried out over a relatively wide temperature range. A suitable temperature range for most purposes is between about 70 and 200° C., and preferably between about 100 and 160° C.

In order to maintain optimum control of the temperature during the reaction it is preferred to stir the reactants, particularly during the early stages of the reaction when the first or second mol of ethylene oxide is introduced into the reaction zone.

The glycerol 1,3-dialkyl ethers employed in the processes of this invention may be prepared by slowly adding epichlorhydrin to an alkanol solution of a sodium or other alkali metal alcoholate of an alkanol containing from 6 to 16 carbon atoms while maintaining the temperature between about 100 and 130° C. After the epichlorhydrin is added the temperature may be raised to about 150 to 200° C. until the reaction is complete. The product is then washed with water to remove dissolved alkali metal salts and alcoholate and is then vacuum distilled.

A further understanding of the chemical products and processes of this invention will be obtained from the following specific examples which are intended to illustrate this invention but not to limit the scope thereof, parts and percentages being by weight unless otherwise specified.

EXAMPLE I (a) *Preparation of glycerol 1,3-di(2-ethylhexyl) ether*

Forty six grams of sodium (2 mols) were dissolved under a blanket of nitrogen gas in 850 cubic centimeters of 2-ethylhexyl alcohol with stirring while heating at 150° C. The reaction mass was cooled to 104° C. and 78 cubic centimeters (1 mol) of epichlorhydrin were added dropwise with stirring over the period of one half hour. The temperature of the reaction mixture rose to 120° C. during this period of time and the temperature was finally raised to 174° C. by heating. The reaction mixture was cooled to room temperature and was then washed with 500 cubic centimeters of water to remove dissolved salts and unreacted sodium 2-ethylhexyl alcoholate. The resulting product was washed again with 250 cubic centimeters of water and was then vacuum distilled. One hundred and forty three and seven-tenths grams of the glycerol, 1,3-di-(2-ethylhexyl) ether were collected at a temperature of 192–194° C. and at a pressure of 7–8 millimeters of mercury absolute. This product gave an acetyl number of 5.28% hydroxyl as compared to a theoretical number of 5.37%.

(b) *Preparation of poly-oxyethylene derivative of glycerol 1,3-di-(2-ethylhexyl) ether*

Ninety grams (0.304 mol) of glycerol 1,3-di-2-ethyl hexyl ether and 1.0 gram of solid potassium hydroxide, as a catalyst, were placed in a flask provided with a stirrer, thermometer and condenser. An exit tube from the flask passed through a test tube containing 6 inches of water. The system was heated to 115° C. and carefully purged of air and oxygen by passing a stream of nitrogen through the system. Ethylene oxide was introduced into the flask, which was maintained in a blanket of nitrogen gas, over a period of 5 hours while the contents of the flask were maintained at 115–125° C. until the weight gain of 67.0 grams was obtained, which weight gain corresponded to the introduction of 5 mols of ethylene oxide per mol of the glycerol 1,3-di-2-ethyl hexyl ether. Fifty grams of the product were removed and this product consisted of a mixture of compounds having the structural formula:

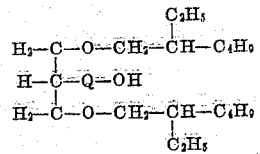

where Q is an average of five (5) —O—$C_2H_4$— (polyoxyethylene) groups. Part of the product remained as an amber liquid and part of the product solidified to an amber pasty solid on cooling. These products dissolved or dispersed in water at low concentrations.

EXAMPLE II

The balance of the product remaining (113 grams) after the removal of 50 grams as described in the last paragraph of Example I was treated with 47 grams of ethylene oxide over a period of 2 hours while maintaining the reaction mixture at a temperature of 125 to 135° C. The procedure used was the same as described in the last paragraph of Example I. The product thus obtained contained 10 mols of ethylene oxide for each mol of glycerol 1,3-di-2 ethyl hexyl ether and consisted of a mixture of products having the structural formula:

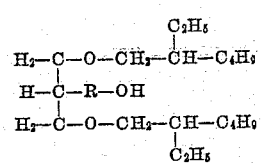

where R is an average of ten (10) —O—$C_2H_4$— (polyoxyethylene) groups. Fifty grams of this product were removed from the remainder of the reaction mixture and were allowed to cool. Part of this product remained as an amber liquid while the major portion solidified to form a pasty amber solid. These products dissolved or dispersed in water in concentrations of at least 0.5%.

EXAMPLE III

One hundred and nine and six-tenths grams of the reaction mixture, which remained after the removal of the 50 gram portion in the procedure of Example II, were treated with 32 grams of ethylene oxide at a temperature of 115–125° C. over a period of one hour using the procedure described in the last paragraph of Example I. The product thus obtained contained 15 mols of ethylene oxide for each mol of glycerol 1,3-di-2-ethyl hexyl ether and consisted of a mixture of products having the structural formula:

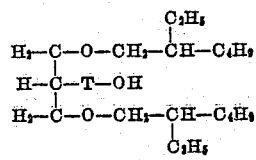

where T represents an average of fifteen (15) —O—$C_2H_4$— (poly-oxyethylene) groups. Fifty grams this product were removed from the remainder of the reaction mixture and were allowed to cool. Substantially all of the product solidified to form a pasty solid which dissolved or dispersed in water in concentrations of at least 0.5%.

EXAMPLE IV

Ninety-one and six-tenths of the product remaining from the procedure of Example III were treated with 16 grams of ethylene oxide over a period of 45 minutes at a temperature of 145–150° C. according to the procedure set forth in the last paragraph of Example I. The resulting product contained 18.9 mols of ethylene oxide per mol of glycerol 1,3-di-2-ethyl hexyl ether and consisted of a mixture of compounds having the structural formula:

$$\begin{array}{c} \phantom{H_2-C-O-CH_2-}C_2H_5 \\ H_2-C-O-CH_2-CH-C_4H_9 \\ H-C-Z-OH \\ H_2-C-O-CH_2-CH-C_4H_9 \\ \phantom{H_2-C-O-CH_2-}C_2H_5 \end{array}$$

where Z represents an average of eighteen and nine-tenths (18.9) —O—$C_2H_4$— (poly-oxyethylene) groups. On cooling the reaction mixture the product solidified to an amber pasty solid which was soluble or dispersible in water at concentrations of at least 0.5%.

EXAMPLE V

The products prepared according to Examples I through IV, hereinafter referred to as products A, B, C and D, respectively, were tested at various concentrations as wetting agents using the Draves-Clarkson test described on pages 162–165 of the 1935–1936 American Association of Textile Chemists and Colorists Yearbook. The following table shows the results obtained at various specific concentrations and a comparison with known wetting agents.

*Draves wetting*

[In seconds at concentrations indicated]

| Product | 0.5% | 0.25% | 0.125% | 0.062% | 0.031% |
|---------|------|-------|--------|--------|--------|
| A       |      | 29.1  | 65.6   | 180+   |        |
| B       | 5.1  | 7.5   | 15.2   | 29.5   | 65.7   |
| C       | 2.4  | 4.3   | 9.7    | 25.4   | 92.1   |
| D       | 4.2  | 7.3   | 14.3   | 34.1   | 77.2   |
| E [1]   |      | 4.0   | 9.0    | 30.0   | 120.0  |
| F [2]   |      | 5.0   | 10.0   | 35.0   | 84.0   |

[1] Condensation product of 100 parts of tertiary dodecyl mercaptan and 228 parts of ethylene oxide.
[2] Sodium dodecyl benzene sulfonate.

The foregoing table indicates that product C, as prepared in Example III and containing 15 mols of ethylene oxide per mol of glycerol 1,3-di-2-ethyl hexyl ether, is superior as a wetting agent, except at the lowest concentration, to products A and B which contain smaller amounts of ethylene oxide or product D which contains larger amounts of ethylene oxide. Moreover, the foregoing table indicates that the products having 10 mols or more of ethylene oxide per mol of glycerol 1,3-di-2-ethyl hexyl ether are good wetting agents. Furthermore, the table indicates that product C is superior as a wetting agent, at normal concentrations, to sodium dodecyl benzene sulfonate, which is a commercial product, and is also superior, as a wetting agent, at lower concentrations, to the condensation product of 100 parts by weight of tertiary dodecyl mercaptan and 228 parts by weight of ethylene oxide.

EXAMPLE VI

The products prepared according to Examples I through IV, hereinafter referred to as products A, B, C and D, respectively, were also tested as detergents according to the detergency test described in an article by Jay C. Harris in a series of articles in the publication "Soap and Sanitary Chemicals" for August and September 1943. The detersive effectiveness of each product in the following table was compared with that of a commercially available synthetic detergent known to the trade as Gardinol WA which is a sodium salt of a sulfated fatty alcohol and is used as a reference equal to 100.

| Product | Detergency, Percent Gardinol | | | |
|---------|---|---|---|---|
|         | Product per se | | Detergent Composition [1] | |
|         | Water Hardness, 50 p.p.m. | Water Hardness, 300 p.p.m. | Water Hardness, 50 p.p.m. | Water Hardness, 300 p.p.m. |
| A           | 25  | 15  | 74  | 70  |
| B           | 106 | 95  | 138 | 138 |
| C           | 126 | 114 | 140 | 133 |
| D           | 117 | 107 | 135 | 131 |
| Gardinol WA | 100 | 100 | 100 | 100 |

[1] Detergent composition consisted of 20% of the product, 1% of purified carboxymethyl cellulose, 40% trisodium pyrophosphate, 19% soluble starch and 20% soda ash.

The foregoing table indicates that products B, C and D which contain 10 mols or more of ethylene oxide are generally superior to Gardinol WA as detergents when such products are used alone or in a detergent composition with builders, and also are superior to Gardinol WA at various water hardnesses. The table also indicates that of the products tested product C gives the best detergency.

Various modifications may be made in the compounds and processes described herein as will be apparent to those skilled in the art to which this invention appertains without departing from the spirit and intent of this invention. Accordingly, it is to be understood that it is not intended to limit this invention except by the scope of the appended claims.

This application is a continuation-in-part of my co-pending application Serial No. 323,337, filed November 29, 1952, and now abandoned.

What is claimed is:

1. Chemical compounds having the structural formula:

$$\begin{array}{c} H_2-C-O-R \\ H-C-(O-C_2H_4)_x-OH \\ H_2-C-O-R' \end{array}$$

where R and R' are alkyl radicals each containing from 6 to 16 carbon atoms and $x$ is a number from 10 to 20, said compounds having wetting and detergent properties.

2. Chemical compounds having the structural formula:

$$\begin{array}{c} H_2-C-O-R'' \\ H-C-(O-C_2H_4)_x-OH \\ H_2-C-O-R''' \end{array}$$

where R'' and R''' are branched chain alkyl radicals having from 6 to 16 carbon atoms in which the carbon atom attached to the oxygen atom has two hydrogen atoms, and $x$ is a number from 10 to 20, said compounds having wetting and detergent properties.

3. Chemical compounds having the structural formula:

$$\begin{array}{c} H_2-C-O-C_8H_{17} \\ H-C-(O-C_2H_4)_d-OH \\ H_2-C-O-C_8H_{17} \end{array}$$

where $d$ is a number from 10 to 20 and the carbon atoms of the $C_8H_{17}$ radicals are arranged in a branched chain and the carbon atom attached to the oxygen atom has two hydrogen atoms, said compounds having wetting and detergent properties.

4. A chemical compound having the structural formula:

$$\begin{array}{c} \phantom{H_2-C-O-CH_2-}CH_2-CH_3 \\ H_2-C-O-CH_2-CH-CH_2-CH_2-CH_2-CH_3 \\ H-C-(O-C_2H_4)_d-OH \\ H_2-C-O-CH_2-CH-CH_2-CH_2-CH_2-CH_3 \\ \phantom{H_2-C-O-CH_2-}CH_2-CH_3 \end{array}$$

where $d$ is a number from 10 to 20, said compound having wetting and detergent properties.

5. A chemical compound having the structural formula as in claim 4, but further characterized in that $d$ represents an average of fifteen —O—C₂H₄— groups.

6. A process of preparing compounds having wetting and detergent properties which comprises reacting from 10 to 20 mols of ethylene oxide with 1 mol of a glycerol-1,3-dialkyl ether having the structural formula:

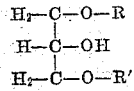

where R and R' are alkyl radicals each containing from 6 to 16 carbon atoms, said reaction being carried out at a temperature between about 100° and 160° C. in the substantial absence of oxygen and in the presence of an alkaline condensing agent.

7. A process of preparing compounds having wetting and detergent properties which comprises reacting from 10 to 20 mols of ethylene oxide with 1 mol of a glycerol-1,3-dialkyl ether having the structural formula:

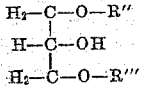

where R" and R''' are branched chain alkyl radicals having from 6 to 16 carbon atoms, said reaction being carried out at a temperature between about 100 and 160° C. in the substantial absence of oxygen and in the presence of an alkaline condensing agent.

8. A process of preparing compounds having wetting and detergent properties which comprises reacting from 10 to 20 mols of ethylene oxide with 1 mol of a glycerol-1,3-dialkyl ether having the structural formula:

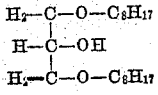

where the $C_8H_{17}$ radicals have branched carbon chains and the carbon atom attached to the oxygen atom has two hydrogen atoms, said reaction being carried out at a temperature between about 100 and 160° C. in the substantial absence of oxygen and in the presence of an alkaline condensing agent.

9. A process of preparing a compound having wetting and detergent properties which comprises reacting from about 10 to 20 mols of ethylene oxide with one mol of glycerol-1,3-di-(2-ethyl hexyl) ether, said reaction being carried out at a temperature between about 100 and 160° C. in the substantial absence of oxygen and in the presence of an alkaline condensing agent.

10. A process of preparing a compound having wetting and detergent properties which comprises reacting about 15 mols of ethylene oxide with one mol of glycerol-1,3-di-(2-ethyl hexyl) ether, said reaction being carried out at a temperature between about 100 and 160° C. in the substantial absence of oxygen and in the presence of an alkaline condensing agent.

References Cited in the file of this patent

UNITED STATES PATENTS

| | | |
|---|---|---|
| 1,970,578 | Schoeller et al. | Aug. 21, 1934 |
| 2,508,035 | Kosmin | May 16, 1950 |
| 2,508,036 | Kosmin | May 16, 1950 |
| 2,617,830 | Kosmin | Nov. 11, 1952 |
| 2,671,115 | Kosmin | Mar. 2, 1954 |
| 2,671,116 | Kosmin | Mar. 2, 1954 |
| 2,674,619 | Lundsted | Apr. 6, 1954 |
| 2,677,700 | Jackson et al. | May 4, 1954 |
| 2,679,521 | De Groote | May 25, 1954 |

OTHER REFERENCES

Chemical and Engineering News, Jan. 30, 1956, pp. 477–480.